US012293623B2

(12) United States Patent
Uenomachi

(10) Patent No.: US 12,293,623 B2
(45) Date of Patent: May 6, 2025

(54) DIVISION CARD

(71) Applicants: LAUREL BANK MACHINES CO., LTD., Tokyo (JP); LAUREL MACHINERY CO., LTD., Osaka (JP); LAUREL PRECISION MACHINES CO., LTD., Osaka (JP)

(72) Inventor: Naoya Uenomachi, Tokyo (JP)

(73) Assignees: LAUREL BANK MACHINES CO., LTD., Tokyo (JP); LAUREL MACHINERY CO., LTD., Osaka (JP); LAUREL PRECISION MACHINES CO., LTD., Osaka (JP)

(*) Notice: Subject to any disclaimer, the term of this patent is extended or adjusted under 35 U.S.C. 154(b) by 0 days.

(21) Appl. No.: 18/555,791

(22) PCT Filed: Apr. 14, 2022

(86) PCT No.: PCT/JP2022/017850
§ 371 (c)(1),
(2) Date: Oct. 17, 2023

(87) PCT Pub. No.: WO2022/224905
PCT Pub. Date: Oct. 27, 2022

(65) Prior Publication Data

US 2024/0212411 A1 Jun. 27, 2024

(30) Foreign Application Priority Data

Apr. 19, 2021 (JP) ................................ 2021-070224

(51) Int. Cl.
*G07D 11/16* (2019.01)
*G07D 7/12* (2016.01)
(Continued)

(52) U.S. Cl.
CPC ............ *G07D 11/165* (2019.01); *G07D 7/12* (2013.01); *G07D 11/22* (2019.01)

(58) Field of Classification Search
CPC ........ G07D 7/12; G07D 11/165; G07D 11/22; B65H 43/00; B65H 2701/1914
See application file for complete search history.

(56) References Cited

U.S. PATENT DOCUMENTS 7,422,117 B2 * 9/2008 Myatt ................ G07D 11/0087 209/534
7,980,394 B2 * 7/2011 Otsuka ...................... B07C 5/34 209/583
(Continued)

FOREIGN PATENT DOCUMENTS

EP 2782076 A1 * 9/2014 ............... B07C 3/18
JP 2017084036 A 5/2017
(Continued)

OTHER PUBLICATIONS

English Translation of JP 2020052649A; Inv: Kaneshiro; Pub. Date: Apr. 2020 (Year: 2020).*
(Continued)

*Primary Examiner* — Joseph C Rodriguez
(74) *Attorney, Agent, or Firm* — Nixon & Vanderhye P.C.

(57) ABSTRACT

A division card can be taken in from an insertion port of a paper sheet processing device for processing paper sheets, being arranged overlapping at least one processing target paper sheet to constitute a paper sheet group together with the processing target paper sheet, and enabling identification information to be read by an intake sensor of the paper sheet processing device, in which the division card comprises a card main body portion having an identification portion including the identification information, and which is formed from a synthetic resin sheet.

6 Claims, 6 Drawing Sheets

(51) Int. Cl.
*G07D 11/165* (2019.01)
*G07D 11/22* (2019.01)

(56) References Cited

U.S. PATENT DOCUMENTS

| | | | | |
|---|---|---|---|---|
| 2007/0095898 | A1* | 5/2007 | Uno | G07D 11/50<br>235/379 |
| 2017/0116810 | A1* | 4/2017 | Tsuji | B65H 39/11 |
| 2022/0351565 | A1* | 11/2022 | Kumagai | G07D 11/235 |

FOREIGN PATENT DOCUMENTS

| | | | |
|---|---|---|---|
| JP | 2020052649 | A | 4/2020 |
| WO | WO 2018/051701 | A1 | 3/2018 |

OTHER PUBLICATIONS

International Search Report for PCT/JP2022/017850 mailed Jun. 7, 2022, 4 pages.
Written Opinion of the ISA for PCT/JP2022/017850, mailed Jun. 7, 2022, 3 pages.
Japanese Office Action mailed Nov. 5, 2024 in Japanese Application No. 2021-070224, with English translation, 6 pages.

* cited by examiner

DIVISION CARD

The present invention relates to a division card.

This application is the U.S. national phase of International Application No. PCT/JP2022/017850 filed Apr. 14, 2022 which designated the U.S. and claims priority to JP Application No. 2021-70224, filed Apr. 19, 2021, the entire contents of each of which are incorporated herein by reference.

TECHNICAL FIELD

Background Art

Patent Document 1 describes a paper sheet processing device that processes two or more processing target paper sheet groups, which are batch processing units, while categorizing the processing target paper sheet groups by division cards.

In the division card described in Patent Document 1, a group of identification holes penetrating in the direction of the card thickness is formed in the card main body portion. The paper sheet processing device of Patent Document 1 detects the division card based on the detection pattern of sensor light passing through a group of identification holes in the division card, and also determines the processing target paper sheet group.

PRIOR ART DOCUMENTS

Patent Document

Patent Document 1

Japanese Unexamined Patent Application, First Publication No. 2017-84036

SUMMARY OF INVENTION

Problems to be Solved by the Invention

However, in a division card such as the one in the Patent Document 1, the card main body portion is made of paper and has through holes. Therefore, this division card may become bent or torn and unusable after repeated use.

The present invention was made in view of the above circumstances, and is intended to provide a division card that can be used repeatedly over a long period of time with increased durability.

Means for Solving the Problems

In order to solve the above issues, the implementation of the present invention adopts the following configuration.

The division card of the first aspect of the present invention is a division card that can be taken in from an insertion port of a paper sheet processing device for processing paper sheets, that is arranged overlapping at least one processing target paper sheet to form a paper sheet group together with the processing target paper sheet, and that enables identification information of the paper sheet group to be read by an intake sensor of the paper sheet processing device, wherein the division card is provided with a card main body portion that has an identification portion including the identification information, and which is formed from a synthetic resin sheet.

By this configuration, the division card according to the first aspect is less likely to bend or tear than a division card with a card main body portion made of paper. Accordingly, the division card according to the first aspect is more durable and can be used repeatedly for a long period of time.

In the division card of the second aspect of the present invention, the card main body portion of the division card of the first aspect of the invention may be provided with a shielding portion that blocks the sensor light without allowing transmission thereof, and an identification portion that allows transmission of the sensor light. The intake sensor of the paper sheet processing device that processes the division card of the second aspect may be a transmissive sensor that reads the identification information using sensor light.

In such a configuration, the paper sheet processing device detects the sensor light transmitted at the identification portion by the intake sensor for the division card according to the second aspect. This allows the paper sheet processing device to read the identification information in the identification portion, such as information that the paper sheet is a division card. Accordingly, in the division card according to the second aspect, there is no need to form a through hole or the like in the identification portion, and thus the durability of the card main body portion can be increased.

In the division card of the third aspect of the present invention, the card main body portion in the division card of the second aspect may be provided with a synthetic resin layer that can transmit the sensor light and a shielding layer as the shielding portion that shields the sensor light, and the identification portion may have an exposed surface that is exposed from the shielding layer.

Such a configuration makes it possible to easily form the shielding portion and the identification portion in the division card of the third aspect, since it is only necessary to shield the portion of the card main body portion that is not the identification portion with the shielding layer.

In the division card of the fourth aspect of the present invention, the card main body portion in the division card of the first or second aspect may be provided with a first edge and a second edge extending in a first direction taken into the paper sheet processing device and provided so as to be back-to-back with each other, and the identification portion may be provided between the first edge and the second edge.

With such a configuration, in the division card of the fourth aspect it is possible to read the identification information from the identification portion even if the intake sensor is placed at any position between the first edge and the second edge extending in the first direction. Accordingly, the degree of freedom for positioning the intake sensor can be improved.

In the division card of the fifth aspect of the present invention, the card main body portion in the division card of the fourth aspect may be provided with a third edge and a fourth edge extending in a second direction orthogonal to the first direction and back-to-back with each other, and as the identification portion there may be provided a first identification portion located on the side near the third edge and extending along the third edge from the first edge to the middle portion in the second direction of the card main body portion, and a second identification portion located on the side near the fourth edge and extending along the fourth edge from the second edge to the middle portion.

With such a configuration, in the division card of the fifth aspect, the identification portion can be provided over the area from the first edge to the second edge by the first identification portion and the second identification portion, while the identification portion can be formed in a manner divided between the first edge and the second edge. Therefore, in the division card of the fifth aspect, the identification information can be read from the identification portion no matter which position the intake sensor is positioned: at the first edge or second edge extending in the first direction. Accordingly, the degree of freedom for arranging the identification portion with respect to the card main body portion can be improved while improving the degree of freedom for arranging the intake sensor.

Advantageous Effects of the Invention

The division card of the present invention will increase the durability of the division card and enable repeated use over a long period of time.

EMBODIMENTS FOR CARRYING OUT THE INVENTION

Hereinbelow, the division card of the embodiment of the present invention will be described with reference to the drawings. A division card in the present embodiment can be taken in from an insertion port of a paper sheet processing device that processes paper sheets.

[Configuration of Paper Sheet Processing Device]

Figure 1:
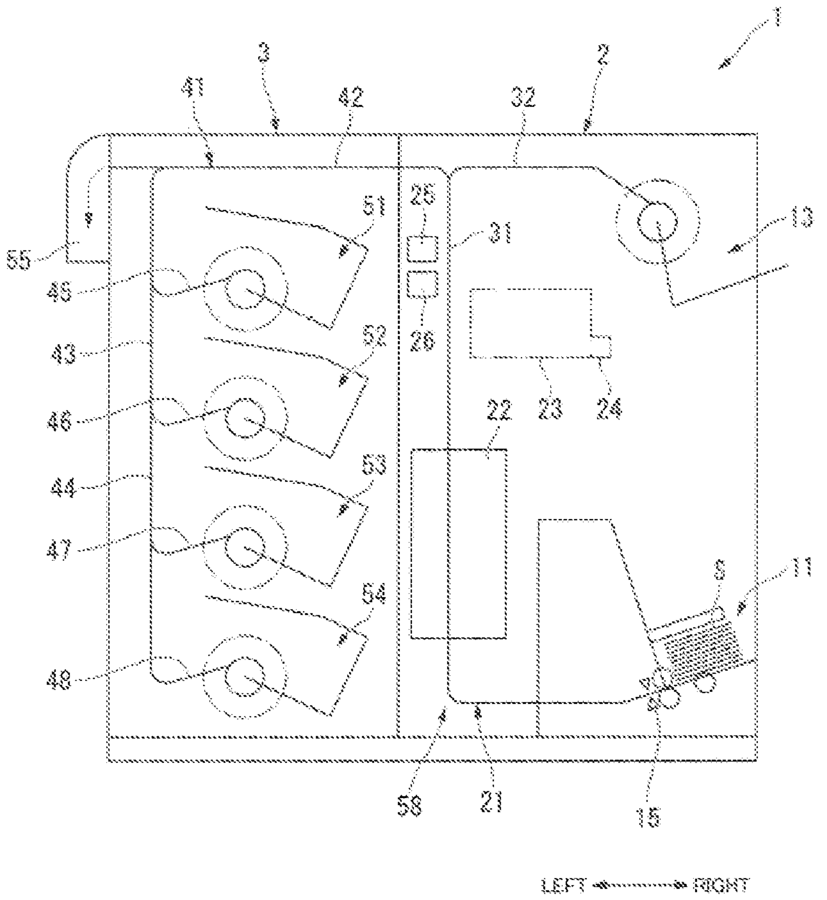
FIG. 1 is a schematic diagram representing an example of a paper sheet processing device using the division card of one embodiment of the present invention.

FIG. 1 is a schematic diagram of a paper sheet processing device that performs processing using a division card in one embodiment of the present invention.

This paper sheet processing device is a device that counts and classifies paper sheets, such as banknotes, securities, and money certificates. The paper sheet processing device 1 classifies incoming paper sheets S into counting target paper sheets, which are subject to counting, and reject paper sheets which are not subject to counting, further counts the counting target sheets by type, stores them by type, and displays the counting results in association with the storage destination. The left-right direction in FIG. 1 is the left-right direction as viewed from the operator of the paper sheet processing device 1.

As shown in FIG. 1, the paper sheet processing device 1 consists of a counting unit 2 and an accumulating unit 3. The counting unit 2 identifies and counts paper sheets S. The accumulating unit 3 performs processing that classifies, accumulates and stores paper sheets S that have been identified and counted by the counting unit 2 and conveyed from the counting unit 2. For example, if the paper sheets S are banknotes, the accumulating unit 3 performs a process such as accumulating a predetermined number of the paper sheets S classified by denomination. The paper sheet processing device 1 can be configured by connecting the desired number of accumulating units 3 to one counting unit 2. In the present embodiment, the case in which one accumulating unit 3 is connected to one counting unit 2 is described as an example.

The counting unit 2 is providing with a reception portion 11 and a reject portion 13. The reception portion 11 is located at the bottom of the counting unit 2 and is always open to the outside. The reception portion 11 accepts paper sheets S inserted from outside the paper sheet processing device 1. In the reception portion 11, multiple paper sheets S are set in a vertically accumulated state with the short sides thereof aligned with the left and right (the left and right directions are shown in the lower part of FIG. 1) and the long sides thereof aligned with the front and back. The reception portion 11 separates and feeds out the paper sheets S placed in such an accumulated state one by one from the bottom one, and takes them into the paper sheet processing device 1. The paper leaves S fed out from the reception portion 11 move in the direction in which the sides thereof extend. The reception portion 11 is provided with an intake sensor 15 that detects at least whether or not paper sheets S are taken in.

The counting unit 2 has within it an in-counting unit conveyance portion 21 and an identification and counting portion 22. The in-counting unit conveyance portion 21 conveys paper sheets S inserted into the reception portion 11 and fed out from the reception portion 11. The identification and counting portion 22 counts paper sheets S being conveyed in the in-counting unit conveyance portion 21 while identifying them.

The in-counting unit conveyance portion 21 has a main conveyance path 31 and a branch conveyance path 32. The main conveyance path 31 extends from the reception portion 11 toward the left side surface of the counting unit 2, then upward, and then further toward the left side surface of the counting unit 2, opening on the left side surface. The branch conveyance path 32 branches off from the top of the main conveyance path 31, extends toward the right-side surface of the counting unit 2, and connects to the reject portion 13. The above identification and counting portion 22 is located more to the reception portion 11 side of the main conveyance path 31, rather than at the branching position of the branch conveyance path 32 in the main conveyance path 31.

Inside the accumulating unit 3, there is an in-accumulating unit conveyance portion 41. The in-accumulating unit conveyance portion 41 is connected to the main conveyance path 31 of the counting unit 2 and conveys paper sheets S that have been fed from the main conveyance path 31. This in-accumulating unit conveyance portion 41 has a connecting conveyance path 42 and a branch conveyance path 43. The connecting conveyance path 42 opens at the top of the right-side surface of the accumulating unit 3, extends horizontally and in a straight line toward the left side surface of the accumulating unit 3, and opens at the top of the left side surface. The branch conveyance path 43 branches down from the middle portion of the left side of the connecting conveyance path 42.

The branch conveyance path 43 of the accumulating unit 3 has a downward extension portion 44 and a plurality of lateral extension portions 45, 46, 47, 48. The downward extension portion 44 branches off from the middle portion of the left side of the connecting conveyance path 42 and extends vertically downward. The lateral extension portions 45, 46, 47, 48 extend from the downward extension portion 44 toward the right side of the accumulating unit 3.

The lateral extension portions 45, 46, 47, 48 are connected to a first accumulating portion 51, a second accumulating portion 52, a third accumulating portion 53, and a fourth accumulating portion 54, which each accumulate and store the paper sheets S. Specifically, the uppermost first accumulating portion 51 is connected to the uppermost lateral extension portion 45. The second accumulating portion 52, which is second from the top, is connected to the lateral extension portion 46, which is second from the top. The third accumulating portion 53, which is third from the top, is connected to the lateral extension portion 47, which is third from the top. The lowest fourth accumulating portion 54 is connected to the lowest lateral extension portion 48.

The first through fourth accumulating portions 51, 52, 53, 54 store paper sheets S that have been identified as subject to storage, among the paper sheets S identified and counted by the identification and counting portion 22. For example, when the accumulating unit 3 performs the process of accumulating a predetermined number of banknotes sorted by denominations, the denominations to be stored in the first through fourth accumulating portions 51, 52, 53, 54 are set in advance, and the first through fourth accumulating portions 51, 52, 53, 54 respectively store banknotes of the target denomination that has been set. The first through fourth accumulating portions 51, 52, 53, 54 are all pocket-shaped, always open to the outside at the front surface of the accumulating unit 3.

At the opposite end of the connecting conveyance path 42 from the counting unit 2 is provided an evacuation pocket 55 that can accommodate the paper sheets S. The evacuation pocket 55 accommodates overflow paper sheets S when any of the first through fourth accumulating portions 51 to 54 are full.

The in-counting unit conveyance portion 21 and the in-accumulating unit conveyance portion 41, which are connected to each other, constitute an intra-device conveying portion 58 that conveys the paper sheets S fed out from the reception portion 11 to various portions within the paper sheet processing device 1.

During conveyance in the intra-device conveying portion 58, the paper sheets S are identified by the intake sensor 15 and the identification and counting portion 22. Downstream from the identification and counting portion 22, the intra-device conveying portion 58 sorts paper sheets S into one of the reject portion 13, the first through fourth accumulating portions 51 to 54, and the evacuation pocket 55, based on the identification results of the intake sensor 15 and the identification and counting portion 22.

The reject portion 13 is always open to the outside at the upper portion of the counting unit 2. The reject portion 13 accumulates the paper sheets S that have been identified by the identification and counting portion 22 as reject paper sheets S, which are other than counting target paper sheets, among the paper sheets S that have been taken into the paper sheet processing device 1 at the reception portion 11, and stores them to be removable to outside the paper sheet processing device 1.

On the front surface of the counting unit 2 of the paper sheet processing device 1, there is an operation display portion 23 that accepts operation inputs by the operator and displays information on a screen for the operator, and an audio output portion 24 that outputs audio information for the operator. Inside the counting unit 2 is a control portion 25 that controls the counting unit 2 and the accumulating unit 3, and a storage portion 26 that stores control programs and various parameters. The control portion 25 controls the entire paper sheet processing device 1.

The identification and counting portion 22 detects image data on both sides of each paper sheet S. Furthermore, the identification and counting portion 22 compares the image data of each side of the paper sheet S with reference data, and identifies the type of the reference data that is determined to be a match as the type of the paper sheet S whose image data was detected.

Figure 2:
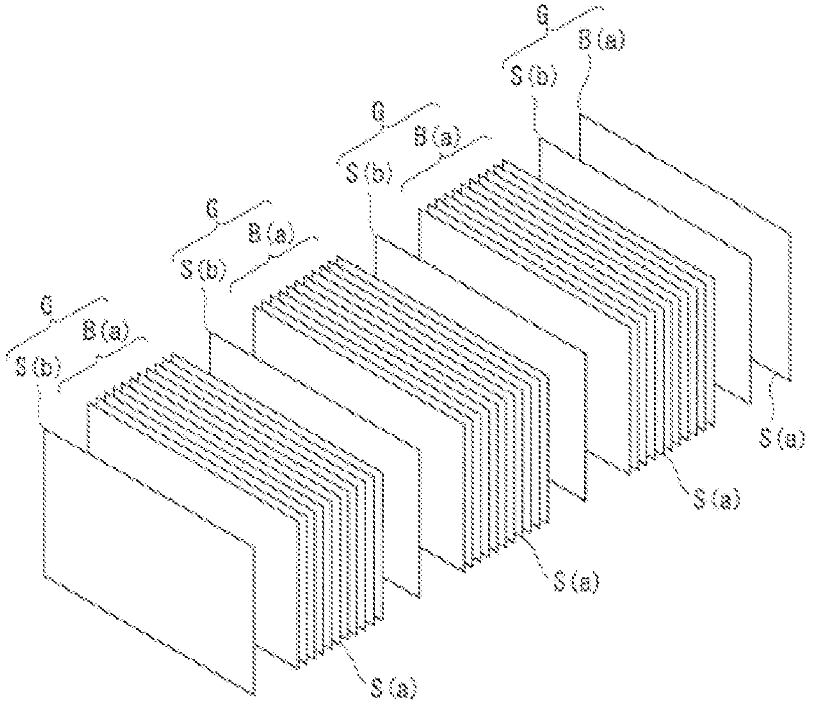
FIG. 2 is a perspective diagram representing paper sheets processed by the paper sheet processing device shown in FIG. 1.

FIG. 2 is a perspective diagram showing paper sheets processed by the paper sheet processing device.

As shown in FIG. 2, the paper sheets include a plurality of division portions B(a), in which a plurality of processing target paper sheets S(a) to be processed for identification and counting are continuously accumulated in the thickness direction and bundled together. The paper sheet processing device 1 can perform batch processing, in which multiple division portions B(a) of paper sheets are processed in succession. In order to perform this batch processing, a division card S(b) for determining the boundary of each division portion B(a) is placed at the beginning position of each division portion B(a) in the paper sheets. In other words, the division card S(b) as a paper sheet S is placed at the beginning position of each division portion B(a) in order to classify each division portion B(a).

Figure 3:
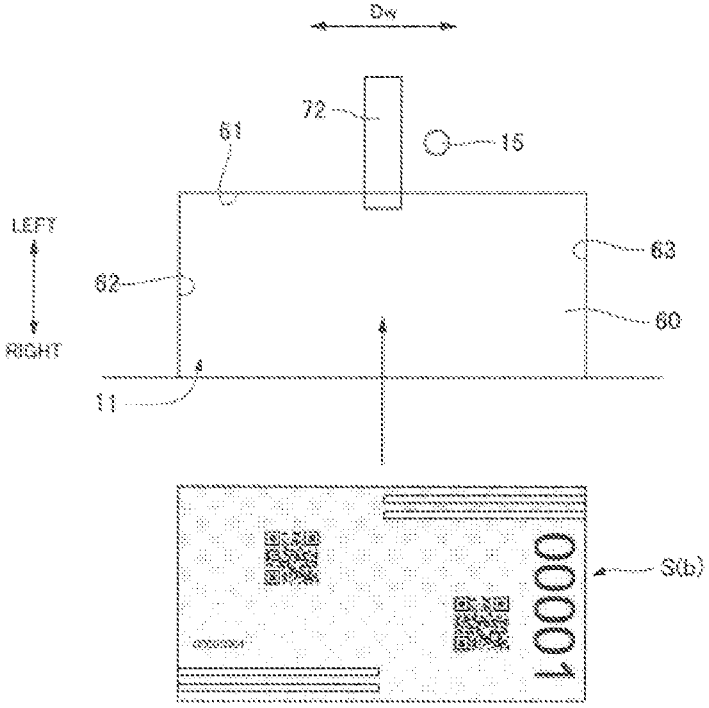
FIG. 3 is a plan view representing the reception portion of the paper sheet processing device shown in FIG. 1 and the division card of one embodiment of the present invention.

FIG. 3 is a plan view of the reception portion of the paper sheet processing device and the division card of the embodiment of the present invention.

As shown in FIG. 3, the reception portion 11 is provided with a bottom portion 60 and wall portions 61, 62, 63. The bottom portion 60 is slightly sloped down to the left relative to the horizontal. The wall portion 61 extends perpendicular to the bottom portion 60 from the left edge of bottom portion 60. The wall portion 62 extends perpendicular to the bottom portion 60 from one edge of the bottom portion 60 in the width direction Dw. The wall portion 63 extends perpendicular to the bottom portion 60 from the other edge of the bottom portion 60 in the width direction Dw. The wall portion 62 and the wall portion 63 are parallel to each other, and the wall portion 61 is perpendicular thereto. In the reception portion 11, a plurality of paper sheet groups G, in each of which are bundled a division portion B(a) of processing target paper sheets S(a) and a corresponding single division card S(b), are stacked and placed on the bottom portion 60 between the wall portions 62 and 63. These multiple stacked paper sheet groups G are then placed so to be in contact with at least the wall portion 61.

The intake sensor 15 detects the intake of the paper sheet groups G from the reception portion 11. As shown in FIGS. 1 and 3, the intake sensor 15 is located downstream of the reception portion 11 in the conveyance direction perpendicular to the width direction Dw of the reception portion 11, and at a position through which the paper sheets S moving along the main conveyance path 31 pass. The intake sensor 15 is arranged at a position displaced by a predetermined distance in this width direction Dw relative to the center of the reception portion 11 in the width direction Dw to avoid interference with an intake roller 72. Specifically, the intake sensor 15 is positioned a predetermined distance offset to the wall portion 63 side in this width direction Dw from the center of the reception portion 11 in the width direction Dw.

The intake sensor 15 is a so-called transmissive sensor having a light-emitting element and a light-receiving element arranged so that the paper sheets S taken in from the reception portion 11 pass therebetween. The intake sensor 15 detects the absence of paper sheets S at the position of the intake sensor 15 when the light-receiving element receives the sensor light emitted from the light-emitting element, and detects the presence of paper sheets S at the position of the intake sensor 15 when the light-receiving element does not receive the sensor light emitted from the light-emitting element. The intake sensor 15 is positioned to be capable of detecting the division card S(b) and processing target paper sheets S(a) of all denominations, which are placed between the wall portions 62 and 63 and taken in.

[Constitution of Division Card]

Figure 4:
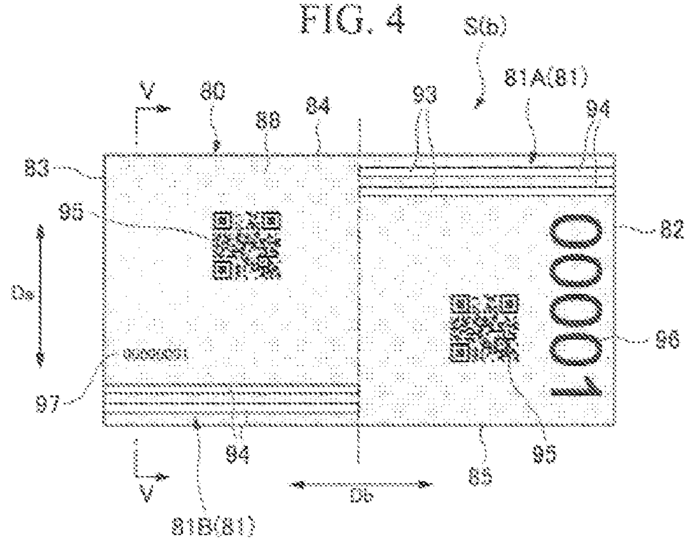
FIG. 4 is a plan view representing the division card of one embodiment of the present invention.
Figure 5:
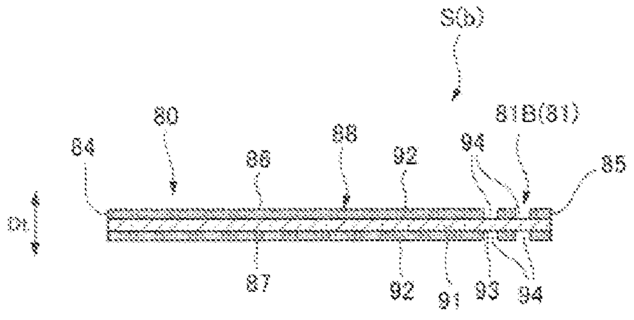
FIG. 5 is a cross-sectional view along the V-V line of FIG. 4.

FIG. 4 is a plan view of the division card of the present embodiment. FIG. 5 is a cross-sectional view along the V-V line of FIG. 4.

As shown in FIGS. 3 to 5, the division card S(b) is formed as a rectangular sheet in plan view. The division card S(b) is formed with the longitudinal length thereof equal to the length of the longest processing target paper sheet S(a) and slightly shorter than the length between the wall portions 62 and 63. In other words, the division card S(b) has the same length or slightly longer length than the processing target paper sheet S(a).

The division card S(b) in this embodiment is set in the reception portion 11 with a long side thereof aligned with the wall portion 61 and the short sides thereof aligned with the wall portion 62 and 63. The division card S(b) is set in the reception portion 11 so as to be in contact with the wall portion 61 and wall portion 63. The reception portion 11 conveys the division card S(b) and processing target paper sheets S(a), both of which are paper sheets S, to the wall portion 61 side in the short-side direction of each to take them into the paper sheet processing device 1. The in-counting unit conveyance portion 21 also conveys the division card S(b) and processing target paper sheets S(a), both of which are paper sheets S, in the short-side direction of each.

The division card S(b) has a card main body portion 80 formed of a synthetic resin sheet with an identification portion 81. The card main body portion 80 in this embodiment is formed as a rectangular sheet in plan view. The card main body portion 80 in this embodiment is provided with a first edge 82, a second edge 83, a third edge 84, and a fourth edge 85. Furthermore, the division card S(b) has a first surface 86 facing the first side of the thickness direction Dt thereof and a second surface 87 facing the second side of the thickness direction Dt, as shown in FIG. 5.

The first edge 82 and the second edge 83 extend in the first direction Da. The first direction Da in this embodiment is the direction in which the paper sheets are taken into the paper sheet processing device 1 described above (in other words, the conveyance direction). The first edge 82 and the second edge 83 are formed back-to-back with each other in the second direction db, which is perpendicular to the first direction Da. The first edge 82 and the second edge 83 in this embodiment are each formed in a straight line that constitutes a short side of the rectangular sheet-like shape in plan view described above.

The third edge 84 and the fourth edge 85 extend in the second direction db. The third edge 84 and the fourth edge 85 are formed back-to-back with each other in the first direction Da. The third edge 84 and the fourth edge 85 in this embodiment are each formed in a straight line that constitutes a long side of the rectangular sheet-like shape in plan view described above.

The card main body portion 80 is provided with a shielding portion 88 and the identification portion 81 described above. The shielding portion 88 blocks the sensor light of the intake sensor 15 without allowing the transmission thereof. The identification portion 81 contains identification information that can be read by the intake sensor 15. As shown in FIG. 5, the card main body portion 80 illustrated in this embodiment has a synthetic resin layer 91, a shielding layer 92, and an exposed surface 93.

The synthetic resin layer 91 is formed to be permeable to sensor light. The synthetic resin layer 91 in this embodiment is formed by a transparent synthetic resin.

The shielding layer 92 is formed, for example, by coloring at least one of the first surface 86 and the second surface 87 of the synthetic resin layer 91, whereby this shielding layer 92 is capable of shielding the sensor light. More specifically, when the shielding layer 92 is located between the light-emitting and light-receiving elements of the intake sensor 15, it is impossible to detect the sensor light with the light-receiving element. In other words, the part of the first surface 86 and the second surface 87 where the shielding layer 92 is formed is the shielding portion 88 described above.

The identification portion 81 contains identification information that can be read by the intake sensor 15. The identification portion 81 in this embodiment contains information to the effect of being the division card S(b). This identification portion 81 is configured to transmit the sensor light. More specifically, the identification portion 81 in this embodiment is composed of an exposed surface 93 where the synthetic resin layer 91 is exposed without being covered by the shielding layer 92. The identification portion 81 can also be referred to as the uncolored, non-colored portion. The exposed surface 93 is formed on both the first surface 86 and the second surface 87 so as to be symmetrically positioned in a manner sandwiching the synthetic resin layer 91. Since the synthetic resin layer 91 is permeable to sensor light as described above, when the identification portion 81 is placed between the light-emitting and light-receiving elements of the intake sensor 15, the sensor light passes through the identification portion 81 and is detected by the light-receiving element. In other words, the presence or absence of the identification portion 81 is detected by the intake sensor 15. When the sensor light is detected by the intake sensor 15, the control portion 25 determines that the taken-in item is the division card S(b). Thus, the identification portion 81 contains information to the effect of being the division card S(b).

The identification portion 81 in this embodiment is provided over the space between the first edge 82 and the second edge 83. In other words, the identification portion 81 is formed at any position in the first direction Da in the card main body portion 80. Furthermore, the card main body portion 80 in this embodiment has a first identification portion 81A and a second identification portion 81B as the identification portion 81. The first identification portion 81A is located closer to the third edge 84 of the card main body portion 80, and the second identification portion 81B is located closer to the fourth edge 85 of the card main body portion 80. The first identification portion 81A extends along the third edge 84 from the first edge 82 to the middle of the card main body portion 80 in the second direction db (the position indicated by the single-dotted line in FIG. 4). The second identification portion 81B extends along the fourth edge 85 from the second edge 83 to the middle in the second direction db. The middle portion in this embodiment means the position in the second direction db where the distance from the first edge 82 is equal to the distance from the second edge 83. In other words, the identification portion 81 in this embodiment has a first identification portion 81A and a second identification portion 81B, which is divided in the first direction Da, but is provided over the entire area between the first edge 82 and the second edge 83. The identification portion 81 and the second identification portion 81B are formed in a straight-line shape with the same thickness in the first direction Da, respectively. Furthermore, the first identification portion 81A in this embodiment has two straight portions 94 spaced apart in the first direction Da. Similarly, the second identification portion 81B has two straight portions 94 spaced apart in the first direction Da.

On the first surface 86 of the division card S(b) is printed a two-dimensional code 95 containing a card-specific number (unique information), which is a card-specific number assigned to each division card S(b). In other words, the card-specific number is included in the reading information obtained by reading this two-dimensional code 95 with a code reader (not shown). The card-specific numbers are assigned to the division cards S(b) in a one-to-one manner, so that there cannot be another division cared S(b) with the same card-specific number, at least among the division cards S(b) intended for the same paper sheet processing device 1.

In the division card S(b) in this embodiment, two two-dimensional codes 95 are printed on the shielding portion 88 of each of the first surface 86 and the second surface 87. The two two-dimensional codes 95 on the first surface 86 are respectively arranged at a position closer to the first edge 82 than the center in the second direction db and closer to the fourth edge 85 in the first direction Da, and at a position closer to the second edge 83 than the center in the second direction db and closer to the third edge 84 in the first direction Da.

In addition, a first text display 96, which is a text display of the card-specific number, is printed near the first edge 82 on the shielding portion 88 of the first surface 86. A second text display 97, which is a text display of the card-specific number, is printed along the second identification portion 81B on the shielding portion 88 of the first surface 86. Although not shown in the figure, the two-dimensional code 95, the first text display 96, and the second text display 97 are similarly printed on the shielding portion 88 of the second surface 87. Furthermore, like the first surface 86, the identification portion 81 is also present on the second surface 87. On the same one division card S(b), a barcode 90 on the first surface 86 and the two-dimensional code 95 on the second surface 87 are the same code. Furthermore, the card-specific number that can be obtained from these two-dimensional codes 95, the card-specific number of the first text display 96 on the first surface 86, the card-specific number of the second text display 97 on the first surface 86, the card-specific number of the first text display 96 on the second surface 87, and the card-specific number of the second text display 97 of the second surface 87 are the same.

[Operation of Paper Sheet Processing Device]

As shown in FIG. 2, during batch processing in the paper sheet processing device 1, a plurality of the paper sheet groups G, which each consists of the division portion B(a) of processing target paper sheets S(a) and one corresponding division card S(b), are stacked and set in the reception portion 11. At that time, each paper sheet group G is set so that the division card S(b) is positioned at the bottom end. When the start operation of the batch processing is input to the operation display portion 23, the control portion 25 causes the paper sheets S to be taken into the paper sheet processing device 1 one by one from the bottom end of the paper sheet group G by the reception portion 11, and to be conveyed by the intra-device conveying portion 58. At that time, based on the identification results of the intake sensor 15 and the identification and counting portion 22, the control portion 25 causes the division card S(b) and the reject paper sheets rejected as other than normal paper sheets among the processing target paper sheets S(a) to be accumulated in the reject portion 13. Based on the identification results of the intake sensor 15 and the identification and counting portion 22, the control portion 25 counts and classifies to the first through fourth accumulating portions 51 to 54 for accumulation the counting target paper sheets identified as normal paper sheets, among the processing target paper sheets S(a). In this way, the paper sheet processing device 1 classifies the paper sheets S while counting them.

[Action Effect]

According to the embodiment of the division card S(b) described above, the card main body portion 80 having the identification portion 81 containing identification information that can be read by the intake sensor 15 is formed of a synthetic resin sheet. Therefore, the division card S(b) is less likely to be bent or torn than a card main body portion 80 made of paper. Accordingly, the division card S(b) is more durable and can be used repeatedly over a longer period of time.

Furthermore, according to the above embodiment of the division card S(b), a transmissive sensor that uses sensor light to read identification information can be used as the intake sensor 15. The card main body portion 80 of the division card S(b) is provided with the shielding portion 88 that blocks the sensor light without allowing the transmission thereof, and an identification portion 81 that can transmit the sensor light. Therefore, by detecting the sensor light transmitted by the identification portion 81 with the intake sensor 15, the paper sheet processing device 1 can read the identification information of the identification portion 81. Therefore, the durability of the card main body portion 80 can be increased because there is no need to form a through hole or the like in the identification portion 81.

According to the division card S(b) of the above embodiment, the card main body portion 80 is provided with the synthetic resin layer 91 that can transmit the sensor light and the shielding layer 92 as the shielding portion 88 that shields the sensor light, and the identification portion 81 has the exposed surface 93 that is exposed without being covered by the shielding layer 92. Therefore, by shielding the portion of the card main body portion 80 that is not the identification portion 81 with the shielding layer 92, it is possible to easily form the shielding portion 88 and the identification portion 81.

Furthermore, according to the above embodiment of the division card S(b), the card main body portion 80 has the first edge 82 and the second edge 83 that extend in the first direction Da and are provided back-to-back with each other, with the identification portion 81 being provided across the space between the first edge 82 and the second edge 83. Therefore, the identification information can be read from the identification portion 81 even if the intake sensor 15 is placed at any position between the first edge 82 and the second edge 83 extending in the first direction Da. Thus, the degree of freedom in the placement of the intake sensor 15 can be improved.

For example, when the identification portion 81 is formed with a through hole, if the identification portion 81 is formed up to the first edge 82 or the second edge 83, since the first edge 82 and the second edge 83 adjacent to the through hole can move freely in the thickness direction Dt of the card main body portion 80 and so may become caught on a step during conveyance, there is a possibility that a jam may occur. In contrast, in the division card S(b) of the above embodiment, there is no need to provide a through hole, so even if the identification portion 81 is formed to the position of the first edge 82 or the second edge 83, it will not cause a jam as described above. As a result, the degree of freedom in the placement of the intake sensor 15 can be further improved.

According to the above embodiment of the division card S(b), the card main body portion 80 is provided with the third edge 84 and the fourth edge 85, which extend in the second direction db orthogonal to the first direction Da and are back-to-back with each other. Furthermore, the card main body portion 80 has the first identification portion 81A located near the third edge 84 and the second identification portion 81B located near the fourth edge 85 of the card main body portion 80. The first identification portion 81A extends along the third edge 84 from the first edge 82 to the middle of the card main body portion 80 in the second direction db, and the second identification portion 81B extends along the fourth edge 85 from the second edge 83 to the middle. Thereby, the identification portion 81 can be provided over the area from the first edge 82 to the second edge 83 by the first identification portion 81A and the second identification portion 81B, while the identification portion 81 can be formed in a manner divided between the first edge 82 and the second edge 83. Therefore, compared to the case where the identification portion 81 is not divided between the first edge 82 and the second edge 83, the area of the shielding portion 88 can be increased, for example, to improve the degree of freedom of placement of the two-dimensional code 95 in the card main body portion 80. The degree of freedom in the placement of the intake sensor 15 can be improved because the identification information can be read from the identification portion 81 regardless of whether the intake sensor 15 is placed at the first edge 82 or the second edge 83, which extend in the first direction Da.

The division card S(b) of the embodiment described above can be modified as in the following modifications 1 to 3.

Modification 1

Figure 6:
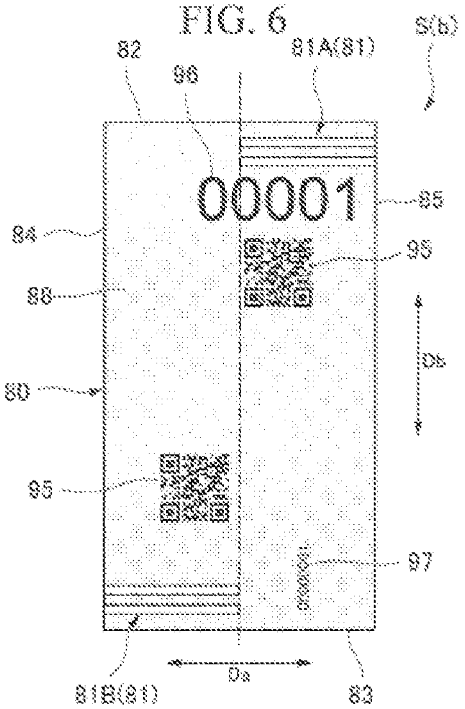
FIG. 6 is a plan view of the division card of modification 1 in one embodiment of the present invention.

FIG. 6 is a plan view of modification 1 in the division card of the embodiment of the present invention.

In the above-described embodiment, the case in which the first direction Da, in which the first edge 82 and the second edge 83, which are the short edges of the division card S(b), extend, is the conveyance direction is described. However, as in modification 1 shown in FIG. 6, the division card S(b) may use the second direction db, in which the third edge and fourth edge 85, the long edges, extend, as the conveyance direction. When the second direction db is made the conveyance direction, one identification portion 81 (the first identification portion 81A) may be provided on the side near the first edge 82 in the second direction db, and one identification portion 81 (the second identification portion 81B) may be provided on the side near the second edge 83 in the second direction db, and these identification portions 81 may be formed from the third edge 84 to the fourth edge 85 in the first direction Da, which is orthogonal to the conveyance direction. According to this modification 1, it is possible to use the division card S(b) even in a paper sheet processing device that uses the long side direction of the paper sheet as the conveyance direction.

Modification 2

Figure 7:
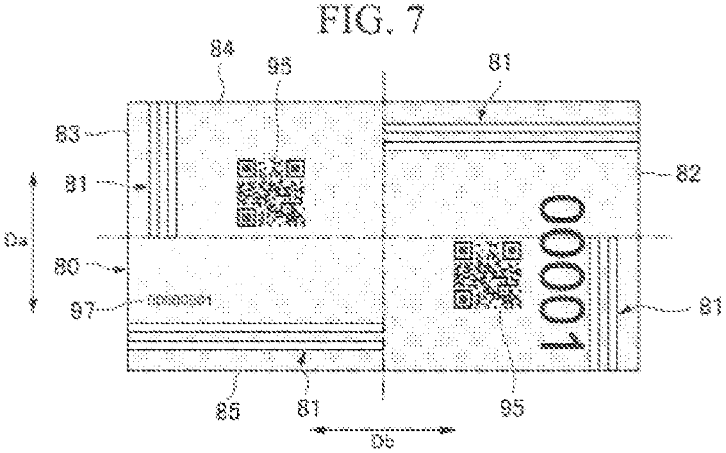
FIG. 7 is a plan view of the division card of modification 2 in one embodiment of the present invention.

FIG. 7 is a plan view of modification 2 in the division card of the embodiment of the present invention. In the above embodiment and modification 1, the case in which the identification portion 81 extends in the first direction Da or in the second direction db was described. However, as shown in modification 2 in FIG. 7, as the plurality of identification portions 81 for example, the identification portion 81 provided on the third edge 84 side of the first direction Da and extending from the first edge 82 to the center in the second direction db, the identification portion 81 provided on the fourth edge 85 side of the first direction Da and extending from the second edge 83 to the center in the second direction db, the identification portion 81 provided on the first edge 82 side of the second direction db and extending from the third edge 84 in the first direction Da to the center in the first direction Da (shown by the alternate long and short dash line in the left-right direction in FIG. 7), and the identification portion 81 provided on the second edge 83 side of the second direction db and extending from the fourth edge 85 in the first direction Da to the center in the first direction Da may each be provided. According to this modification 2, it is possible to use the division card S(b) for both the paper sheet processing device 1 that uses the short side direction of the paper sheet S as the conveyance direction and the paper sheet processing device 1 that uses the long side direction of the paper sheet S as the conveyance direction.

Modification 3

Figure 8:
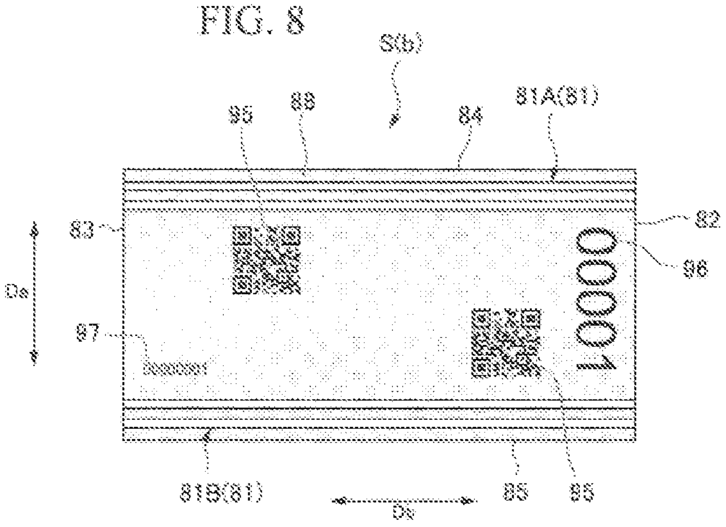
FIG. 8 is a plan view of the division card of modification 3 in one embodiment of the present invention.

FIG. 8 is a plan view of modification 3 in the division card of the embodiment of the present invention. The above-described embodiment describes a case in which the first identification portion 81A is formed from the first edge 82 to the center and the second identification portion 81B is formed from the second edge 83 to the center, with the identification portion 81 being thus formed in a manner divided in the second direction db. However, as in modification 3 shown in FIG. 8, for example, the first identification portion 81A may be formed from the first edge 82 to the second edge 83, and the second identification portion 81B may be formed from the second edge 83 to the first edge 82. In this way, one intake sensor 15 can detect both the first identification portion 81A and the second identification portion 81B, thus providing redundancy.

Other Modification

The above-described embodiment describes a case in which the first identification portion 81A is formed from the first edge 82 to the center, and the second identification portion 81B is formed from the second edge 83 to the center, with the identification portion 81 being thus formed in a manner divided in the second direction db. The first identification portion 81A and the second identification portion 81B may each be divided at specific positions other than the center. Furthermore, the first identification portion 81A may be provided from the first edge 82 to a first specific position, and the second identification portion 81B may be provided from a second specific position, which is different from the first specific position, to the second edge 83.

Other Embodiments

Although one preferred embodiment has been described in detail with reference to the drawings above, the specific configuration is not limited to the one described above, and various design changes and the like can be made.

For example, the above embodiment describes a case where the division card S(b) is provided with a transparent synthetic resin layer 91. This synthetic resin layer, provided it be capable of transmitting sensor light, is not limited to being transparent.

Furthermore, the above embodiment describes a case in which the identification portion 81 of the division card S(b) is the exposed surface 93 that does not penetrate in the direction of the thickness Dt thereof, but the identification portion 81 may be configured to penetrate in the thickness direction Dt.

In the above embodiment, the case in which the two-dimensional code 95 is provided was described, but a barcode may be provided along with the two-dimensional code 95, or only a barcode may be provided without the two-dimensional code 95.

Furthermore, in the above embodiment, the case in which the identification portion 81 has a straight portion 94 with a constant thickness was described. The identification portion 81 is not limited to a straight line, but may have a circular shape, an elongated hole shape, a polygon shape, or other shapes, for example. The identification portion 81 may be a through hole with a circular, elongated hole, polygonal, or other shape.

In the above embodiment, the case in which the first identification portion 81A and the second identification portion 81B each have two straight portions 94 was described. The first identification portion 81A and the second identification portion 81B may each have one straight portion 94.

INDUSTRIAL APPLICABILITY

The present invention provides a division card that is applicable to a division card used in a paper sheet processing device, and that can be used repeatedly over a long period of time with increased durability.

REFERENCE SIGNS LIST

1 Paper sheet processing device
2 Counting unit
3 Accumulating unit
11 Reception portion
13 Reject portion
15 Intake sensor
21 In-counting unit conveyance portion
22 Identification and counting portion
23 Operation display portion
24 Audio output portion
25 Control portion
26 Storage portion
31 Main conveyance path
32 Branch conveyance path
41 In-accumulating unit conveyance portion
42 Connecting conveyance path
43 Branch conveyance path
44 Downward extension portion
45~48 Lateral extension portion
51 First accumulating portion
52 Second accumulating portion
53 Third accumulating portion
54 Fourth accumulating portion
55 Evacuation pocket
58 Intra-device conveying portion
60 Bottom portion
61, 62, 63 Wall portion
72 Intake roller
80 Card main body portion
81 Identification portion
82 First edge
83 Second edge
84 Third edge
85 Fourth edge
86 First surface
87 Second surface
88 Shielding portion
91 Synthetic resin layer
92 Shielding layer
93 Exposed surface
94 Straight portion
95 Two-dimensional code
96 First text display
97 Second text display
B(a) Division portion
G Paper sheet group
S Paper sheet
S(a) Processing target paper sheet
S(b) Division card

The invention claimed is:

1. A division card comprising identification information configured to be read by an intake sensor of a paper sheet processing device that takes the division card in from an insertion port of the paper sheet processing device for processing paper sheets, the division card being arranged to overlap at least one processing target paper sheet to form a paper sheet group together with the processing target paper sheet, the division card comprising a card main body portion that comprises a synthetic resin sheet configured to transmit sensor light of the intake sensor, a shielding portion including a shielding layer covering a first area of the synthetic resin sheet, the shielding layer being configured to shield the sensor light of the intake sensor, and an exposed surface on a second area of the synthetic resin sheet that does not include the shielding portion, the exposed surface serving as an identification portion including the identification information, and the first area of the shielding portion on the synthetic resin sheet being larger than the second area of the exposed surface.

2. The division card according to claim 1, wherein the card main body portion comprises a first edge and a second edge extending in a first direction taken into the paper sheet processing device and provided so as to be back-to-back with each other, and the identification portion is provided between the first edge and the second edge.

3. The division card according to claim 2, wherein the card main body portion is provided with a third edge and a fourth edge extending in a second direction orthogonal to the first direction and back-to-back with each other, and as the identification portion are provided a first identification portion located on the side near the third edge and extending along the third edge from the first edge to the middle portion in the second direction, and a second identification portion located on the side near the fourth edge and extending along the fourth edge from the second edge to the middle portion.

4. The division card according to claim 2, wherein the shielding layer covers a majority of an upper and/or a lower surface of the synthetic resin sheet.

5. The division card according to claim 2, wherein the shielding layer covers a majority of an upper surface and a majority of a lower surface of the synthetic resin sheet.

6. The division card according to claim 2, wherein the shielding layer is configured to block the sensor light of the intake sensor, thus preventing transmission of the sensor light through the synthetic resin sheet.

* * * * *